(12) United States Patent
Buse

(10) Patent No.: US 11,692,916 B2
(45) Date of Patent: Jul. 4, 2023

(54) SYSTEM FOR MIXING CONTENTS OF CONTAINERS AND RELATED METHODS OF USE

(71) Applicant: Gen-Probe Incorporated, San Diego, CA (US)

(72) Inventor: David A. Buse, San Diego, CA (US)

(73) Assignee: GEN-PROBE INCORPORATED, San Diego, CA (US)

( * ) Notice: Subject to any disclaimer, the term of this patent is extended or adjusted under 35 U.S.C. 154(b) by 503 days.

(21) Appl. No.: 15/934,117

(22) Filed: Mar. 23, 2018

(65) Prior Publication Data

US 2018/0275028 A1 Sep. 27, 2018

Related U.S. Application Data

(60) Provisional application No. 62/476,364, filed on Mar. 24, 2017.

(51) Int. Cl.
*G01N 1/38* (2006.01)
*B01F 9/00* (2006.01)
(Continued)

(52) U.S. Cl.
CPC ............... *G01N 1/38* (2013.01); *B01F 29/15* (2022.01); *B01F 29/34* (2022.01); *B01F 31/22* (2022.01);
(Continued)

(58) Field of Classification Search
CPC .......... B01F 15/00253; B01F 15/00285; B01F 15/00376; B01F 9/10; B01F 9/003;
(Continued)

(56) References Cited

U.S. PATENT DOCUMENTS 5,060,151 A 10/1991 Mikyska et al.
5,375,927 A 12/1994 Hermsen et al.
(Continued)

FOREIGN PATENT DOCUMENTS

JP 2011-19488 A 2/2011
JP 2016-514051 A 5/2016
WO 2014/153116 A2 9/2014

OTHER PUBLICATIONS

PCT International Preliminary Report on Patentability, International Application No. PCT/US2018/024016, dated Sep. 24, 2019.
(Continued)

*Primary Examiner* — Elizabeth Insler
(74) *Attorney, Agent, or Firm* — Sterne, Kessler, Goldstein & Fox P.L.L.C.; Charles B. Cappellari

(57) ABSTRACT

A method for mixing fluids in containers may include performing a mixing procedure on a plurality of containers on a container support, at least a portion of the plurality of containers being differently sized. The mixing procedure may include a plurality of mixing phases, wherein in each mixing phase the container support may be subjected to a mixing motion at a single rate for a period of time of about 5 seconds or longer, and wherein the single rate for at least one mixing phase of the plurality of mixing phases may differ from the single rate for at least one other mixing phase of the plurality of mixing phases. The mixing procedure also may include at least one non-mixing phase, wherein the container support may not be subjected to the mixing motion.

29 Claims, 11 Drawing Sheets

(51) Int. Cl.
  *B01F 15/00* (2006.01)
  *B01F 29/15* (2022.01)
  *B01F 29/34* (2022.01)
  *B01F 31/22* (2022.01)
  *B01F 35/213* (2022.01)
  *B01F 35/511* (2022.01)
  *B01F 35/22* (2022.01)
  *B01F 35/221* (2022.01)
  *B01F 35/33* (2022.01)
  *B01F 101/23* (2022.01)

(52) U.S. Cl.
  CPC ........ *B01F 35/213* (2022.01); *B01F 35/2202* (2022.01); *B01F 35/2206* (2022.01); *B01F 35/2209* (2022.01); *B01F 35/22142* (2022.01); *B01F 35/511* (2022.01); *B01F 35/331* (2022.01); *B01F 35/332* (2022.01); *B01F 2101/23* (2022.01); *G01N 2001/386* (2013.01)

(58) Field of Classification Search
  CPC .......... B01F 9/0001; B01F 9/22; B01F 29/15; B01F 29/321; B01F 35/22142; B01F 31/20; B01F 31/22; G01N 1/38
  See application file for complete search history.

(56) References Cited

U.S. PATENT DOCUMENTS

| | | | |
|---|---|---|---|
| 6,579,002 | B1 | 6/2003 | Bartick et al. |
| 2014/0064019 | A1* | 3/2014 | Hamada .............. B01F 11/0017 366/213 |
| 2014/0286124 | A1* | 9/2014 | Donohue ........... G01N 35/1002 366/342 |
| 2015/0102059 | A1 | 4/2015 | Santrach et al. |
| 2018/0304175 | A1* | 10/2018 | Takaoka ................. B29B 7/106 |

OTHER PUBLICATIONS

PCT, International Search Report and Written Opinion, International Patent No. PCT/US2018/024016, dated Aug. 21, 2018.
EPO Communication pursuant to Article 94(3) EPC, European Application No. 18716842.2, dated Nov. 24, 2020.
CNIPA, Second Office Action, Chinese Application No. 201880020516. 9., dated Jun. 6, 2022.
EPO Communication pursuant to Article 94(3) EPC, European Application No. 18716842.2, dated Feb. 28, 2022.
JPO Office Action, Japanese Patent Application No. 2019-552097, dated Sep. 5, 2022.
CNIPA, Third Office Action, Chinese Application No. 201880020516. 9., dated Dec. 26, 2022.
CNIPA, Third Search Report, Chinese Application No. 201880020516. 9., dated Dec. 20, 2022.
"Fluid Flow and Heat Transfer Fascicle." *Chemical Principles*, edited by Hongliu Zhang, National Defense Industry Press, Beijing, 2009, pp. 204-205.
IPA Examination report No. 1, Australian Application No. 2018237575, dated Jan. 27, 2023.
JPO Official Acton, Japanese Patent Application No. 2019-552097, dated Mar. 29, 2023.

* cited by examiner

SYSTEM FOR MIXING CONTENTS OF CONTAINERS AND RELATED METHODS OF USE

CROSS-REFERENCE TO RELATED APPLICATION(S)

This patent application claims the benefit under 35 U.S.C. § 119 to U.S. Provisional Patent Application No. 62/476,364, filed on Mar. 24, 2017, the entirety of which is incorporated herein by reference.

TECHNICAL FIELD

This disclosure is directed to systems for mixing contents of containers and related methods of use.

BACKGROUND

Automated analytical procedures for determining the presence of an analyte in a sample typically require the use, processing, and/or manipulation of fluid solutions and/or fluid suspensions. Such fluid solutions and fluid suspensions are frequently stored in containers that can be accessed by a fluid extraction device having a probe tip (e.g., a robotic pipettor). The fluid extraction device having a probe tip may remove precise amounts of the fluid contents of the containers. The fluid contents of the containers may be accessed through open ends of the containers (e.g., uncapped and exposed to the atmosphere) during the operation of the fluid extraction device having a probe tip, although it may be necessary to access the contents of a container through a penetrable seal, filter, and/or septum.

A fluid solution in a container may require mixing to maintain a solute in solution. A fluid suspension in a container may require mixing to maintain a material, such as solid or semi-solid particles, in suspension. If the process of mixing a fluid solution and/or a fluid suspension in a container is inadequate, a fluid extraction device having a probe tip may remove a quantity of the fluid solution and/or fluid suspension that does not have the desired amount of solute and/or suspended materials. On the other hand, the process of mixing can lead to the formation of foam at the surface of the fluid contents. Detergent-based fluid contents are especially prone to forming foam when agitated. The foam may make it difficult for the fluid extraction device having a probe tip to remove a precise amount of the fluid contents. For example, the presence of foam can result in inaccurate level sensing by the fluid extraction device having a probe tip, by causing the apparatus to sense more of the fluid contents than is actually present in the container. The foam also may enter the fluid extraction device having a probe tip, possibly resulting in the fluid extraction device having a probe tip aspirating less of the fluid contents of the container than desired. Any of these factors may affect a result obtained from performing an analytical procedure using the fluid contents.

SUMMARY OF THE DISCLOSURE

In one aspect, the present disclosure is directed to a method for mixing fluids in containers. The method may include performing a mixing procedure on a plurality of containers on a container support, at least a portion of the plurality of containers being differently sized. The mixing procedure may include a plurality of mixing phases, wherein in each mixing phase the container support may be subjected to a mixing motion at a single rate for a period of time of about 5 seconds or longer, and wherein the single rate for at least one mixing phase of the plurality of mixing phases may differ from the single rate for at least one other mixing phase of the plurality of mixing phases. The mixing procedure also may include at least one non-mixing phase, wherein the container support may not be subjected to the mixing motion.

Subjecting the container support to the mixing motion may include rotating the container support about an axis offset from a center of the container support. Subjecting the container support to the mixing motion may include rotating the container support about an axis extending through the center of the container support. Each of the single rates may be a speed of the container support, and the speed of the container support may change going from one mixing phase to an adjacent mixing phase of the plurality of mixing phases. Each of the single rates may be a frequency of rotation of the container support about an axis of rotation, and the frequency of rotation may change going from one mixing phase to an adjacent mixing phase of the plurality of mixing phases. Subjecting the container support to the mixing motion may result in swirling of fluids in the containers. The swirling of the fluids may result in the formation of waves in the fluids, and amplitudes of the waves may reach one or more predetermined threshold values. Feedback may be obtained after performance of the mixing procedure, and the mixing procedure may be modified based on the feedback. The feedback may be indicative of an effectiveness of the plurality of mixing phases at mixing one or more fluids in one or more containers of the plurality of containers. The feedback may be indicative of an amount of foam formed in one or more fluids in one or more containers of the plurality of containers. The mixing procedure may include a first cycle of mixing phases and a second cycle of mixing phases, wherein the single rates of the mixing phases of the first cycle are the same as the single rates of the mixing phases of the second cycle, and wherein the periods of time of the mixing phases of the first cycle are longer than the periods of time of the mixing phases of the second cycle. In the at least one non-mixing phase, the container support may be motionless. In the at least one non-mixing phase, the container may move. The mixing procedure may be repeated at least once.

In another aspect, the present disclosure is directed to a method for mixing fluids in containers. The method may include performing a mixing procedure on a plurality of containers on a container support, at least a portion of the plurality of containers being differently sized. The mixing procedure may include a first mixing phase including a mixing motion of the container support at a first rate for a first period of time of about 5 seconds or longer. The mixing procedure may include a second mixing phase performed after the first mixing phase, wherein the second mixing phase may include the mixing motion of the container support at a second rate for a second period of time of about 5 seconds or longer, the first rate being different than the second rate, and the first period of time being different than the second period of time. After the second mixing phase, any of the mixing motion may not be performed for a third period of time.

The mixing motion may include rotation of the container support. Rotation of the container support may include rotation of the container support about an axis of rotation offset from a center of the container support. Rotation of the container support may include rotation of the container support about an axis of rotation extending through the center of the container support. At least one of the first rate and the second rate may include a speed of the container support. At least one of the first rate and the second rate may include a frequency of rotation of the container support. The first rate may be greater than the second rate. The first period of time may be shorter than the second period of time. The mixing procedure may be repeated at least once.

In yet another aspect, the present disclosure is directed to a method for mixing fluids in containers. The method may include performing a mixing procedure on a plurality of containers on a container support. The mixing procedure may include a first phase including moving the container support at a first rate for a first period of time of longer than about 5 seconds, wherein the first rate and the first period of time may be selected to substantially uniformly mix a fluid in a first container of the plurality of containers, and wherein the first container may have a first size. The mixing procedure also may include a second phase performed after the first phase, wherein the second phase may include moving the container support at a second rate for a second period of time of longer than about 5 seconds, the first rate being different than the second rate. The second rate and the second period of time may be selected to substantially uniformly mix a fluid in a second container of the plurality of containers. The second container may have a second size different than the first size. The mixing procedure also may include a third phase performed after the second phase, wherein the third phase may include not moving the container support for a third period of time, and wherein the period of time may be selected to allow foam formed in the fluid of at least one of the first and second containers to dissipate.

Moving the container support may include rotating the container support. Rotating the container support may include rotating the container support about an axis of rotation offset from a center of the container support. Rotating the container support may include rotating the container support about an axis of rotation extending through the center of the container support. At least one of the first rate and the second rate may include a speed of the container support. At least one of the first rate and the second rate may include a frequency of rotation of the container support. The first rate may be greater than the second rate. The first period of time may be different than the second period of time. The first period of time may be shorter than the second period of time. The mixing procedure may be repeated at least once. The mixing procedure further may include a fourth phase performed after the third phase, the fourth phase including moving the container support at the first rate for a fourth period of time shorter than the first period of time. The fourth period of time may be half the duration of the first period of time. The mixing procedure may further include a fifth phase performed after the fourth phase, the fifth phase including moving the container support at the second rate for a fifth period of time shorter than the second period of time.

In yet another aspect, the present disclosure is directed to a method for mixing fluids in containers. The method may include identifying a first set of rates at which a first container is movable to result in a first set of values indicative of degrees of mixing of a fluid in the first container, and identifying a second set of rates at which a second container is movable to result in a second set of values indicative of degrees of mixing of a fluid in the second container. The method also may include selecting a first rate from the first set of rates based at least in part on the first set of values, and selecting a second rate from the second set of rates based at least in part on the second set of values. The method also may include subjecting a container support to a mixing motion, the mixing motion being performed at the first rate for a first period of time longer than about 5 seconds and at the second rate for a second period of time longer than about 5 seconds, wherein the first and second containers may be disposed on the container support during the mixing motion. The method also may include subjecting the container support to no mixing motion for a third period of time while the first and second containers may be disposed on the container support.

The first and second sets of rates may include speeds of the container support. The first and second sets of rates may include frequencies of rotation of the container support. The first and second sets of values may correspond to movements of the fluids in the first and second containers. The first rate may be different than the second rate. The first rate may be a minimum rate that corresponds to a value of the first set of values that reaches at least a predetermined threshold for mixing of the fluid in the first container. The first rate may result in a maximum value of the first set of values. The second rate may be a minimum rate that corresponds to a value of the second set of values that reaches at least a predetermined threshold for mixing of the fluid in the second container. The second rate may result in a maximum value of the second set of values. Selecting the first rate from the first set of rates may be based at least in part on the second set of values.

In yet another aspect, the present disclosure is directed to a method for mixing fluids in containers. The method may include performing a mixing procedure on a plurality of containers on a container support. The mixing procedure may include ordered steps. The ordered steps may include moving the container support at a first rate for a first period of time longer than about 5 seconds, moving the container support at a second rate for a second period of time longer than about 5 seconds, wherein the first rate is different than the second rate, and stopping the container support, and not moving the container support for a third period of time. The method also may include determining an extent to which foam appears in a fluid contained in at least one of the plurality of containers as a result of moving the container support. The method also may include modifying one or more aspects of the mixing procedure based on the determined extent.

Determining the extent to which foam appears in the fluid may include inserting a sensing device into the fluid, the sensing device being configured to detect foam in the fluid. Modifying one or more aspects of the mixing procedure may include decreasing the first rate. Modifying one or more aspects of the mixing procedure may include decreasing the first period of time. Modifying one or more aspects of the mixing procedure may include decreasing the second rate. Modifying one or more aspects of the mixing procedure may include decreasing the second period of time. Modifying one or more aspects of the mixing procedure may include increasing the third period of time.

In yet another aspect, the present disclosure is directed to a method for mixing fluids in containers. The method may include performing a mixing procedure on a plurality of containers on a container support. The mixing procedure may include ordered steps. The ordered steps may include moving the container support at a first rate for a first period of time longer than about 5 seconds, moving the container support at a second rate for a second period of time longer than about 5 seconds, wherein the first rate is different than the second rate, and stopping the container support, and not moving the container support for a third period of time. The method also may include determining an effectiveness of mixing a fluid contained in at least one of the plurality of containers as a result of moving the container support. The method also may include modifying one or more aspects of the mixing procedure based on the determined effectiveness.

Determining the effectiveness of mixing the fluid may include taking optical density measurements of different portions of the fluid and comparing the optical density measurements to determine if a difference between the optical density measurements meets a predetermined threshold. Modifying one or more aspects of the mixing procedure may include increasing the first rate. Modifying one or more aspects of the mixing procedure may include increasing the first period of time. Modifying one or more aspects of the mixing procedure may include increasing the second rate. Modifying one or more aspects of the mixing procedure may include increasing the second period of time. Modifying one or more aspects of the mixing procedure may include decreasing the third period of time.

In yet another aspect, the present disclosure is directed to a method for mixing fluids in containers. The method may include performing a mixing procedure on a plurality of containers on a container support, the mixing procedure including ordered steps. The ordered steps may include subjecting the container support to a mixing motion at a first rate for a first period of time longer than about 5 seconds, wherein the first rate and the first period of time may be selected to substantially uniformly mix a fluid in a first container of the plurality of containers, and wherein the first container may have a first size. The ordered steps also may include subjecting the container support to the mixing motion at a second rate for a second period of time longer than about 5 seconds, wherein the first rate may be different than the second rate, wherein the second rate and the second period of time are selected to substantially uniformly mix a fluid in a second container of the plurality of containers, and wherein the second container may have a second size different than the first size. The ordered steps also may include not performing the mixing motion on the container support for a third period of time. The method also may include determining a value indicative of an extent to which foam appears in at least one of the fluid in the first container and the fluid in the second container. The method also may include modifying one or more aspects of the mixing procedure if the value is different than a threshold value, wherein modifying one or more aspects of the mixing procedure includes modifying one or more of the first rate, the first period of time, the second rate, the second period of time, and the third period of time, wherein the modification may selected to move the value toward the threshold value.

Determining the value indicative of the extent to which foam appears in at least one of the fluids in the first and second containers may include inserting a sensing device into the at least one of the fluids, the sensing device being configured to detect foam in the at least one of the fluids. Modifying one or more aspects of the mixing procedure may include decreasing the first rate. Modifying one or more aspects of the mixing procedure may include decreasing the first period of time. Modifying one or more aspects of the mixing procedure may include decreasing the second rate. Modifying one or more aspects of the mixing procedure may include decreasing the second period of time. Modifying one or more aspects of the mixing procedure may include increasing the third period of time.

In yet another aspect, this disclosure is directed to a system for mixing fluids in a plurality of differently sized containers. The system may include a container support for receiving the plurality of differently sized containers thereon. The system also may include a drive system operatively coupled to the container support, wherein the drive system may be configured to move the container support in a mixing motion. The system also may include a controller operatively coupled to the drive system, wherein the controller may be configured to control operation of the drive system to perform a mixing procedure with the container support. In the mixing procedure, the container support may be moved in the mixing motion at a first rate for a first period of time longer than about 5 seconds, the container support may be moved in the mixing motion at a second rate for a second period of time longer than about 5 seconds, the first rate being different than the second rate, and the container support may not be moved in any mixing motion for a third period of time.

The drive system may be configured to rotate the container support about an axis offset from a center of the container support. The drive system may be configured to rotate the container support about an axis extending through the center of the container support. At least one of the first rate and the second rate may include a speed of the container support. At least one of the first rate and the second rate may include a frequency of rotation of the container support. The first rate may be greater than the second rate. The first period of time may be different than the second period of time. The first period of time may be shorter than the second period of time. In the mixing procedure the container support may be moved in the mixing motion at one or more rates other than the first and second rates for other periods of time. The controller may be further configured to repeat the mixing procedure at least once.

BRIEF DESCRIPTION OF THE FIGURES

The accompanying drawings, which are incorporated in and constitute a part of this specification, illustrate various examples and together with the description, serve to explain the principles of the disclosed examples.

DETAILED DESCRIPTION

Reference will now be made in detail to examples of the present disclosure, which are illustrated in the accompanying drawings. Wherever possible, the same reference numbers will be used throughout the drawings to refer to the same or like parts. In the discussion that follows, relative terms such as "about," "substantially," "approximately," etc. are used to indicate a possible variation of ±10% in a stated value, numeric or otherwise.

Mixing Apparatus

Figure 1:
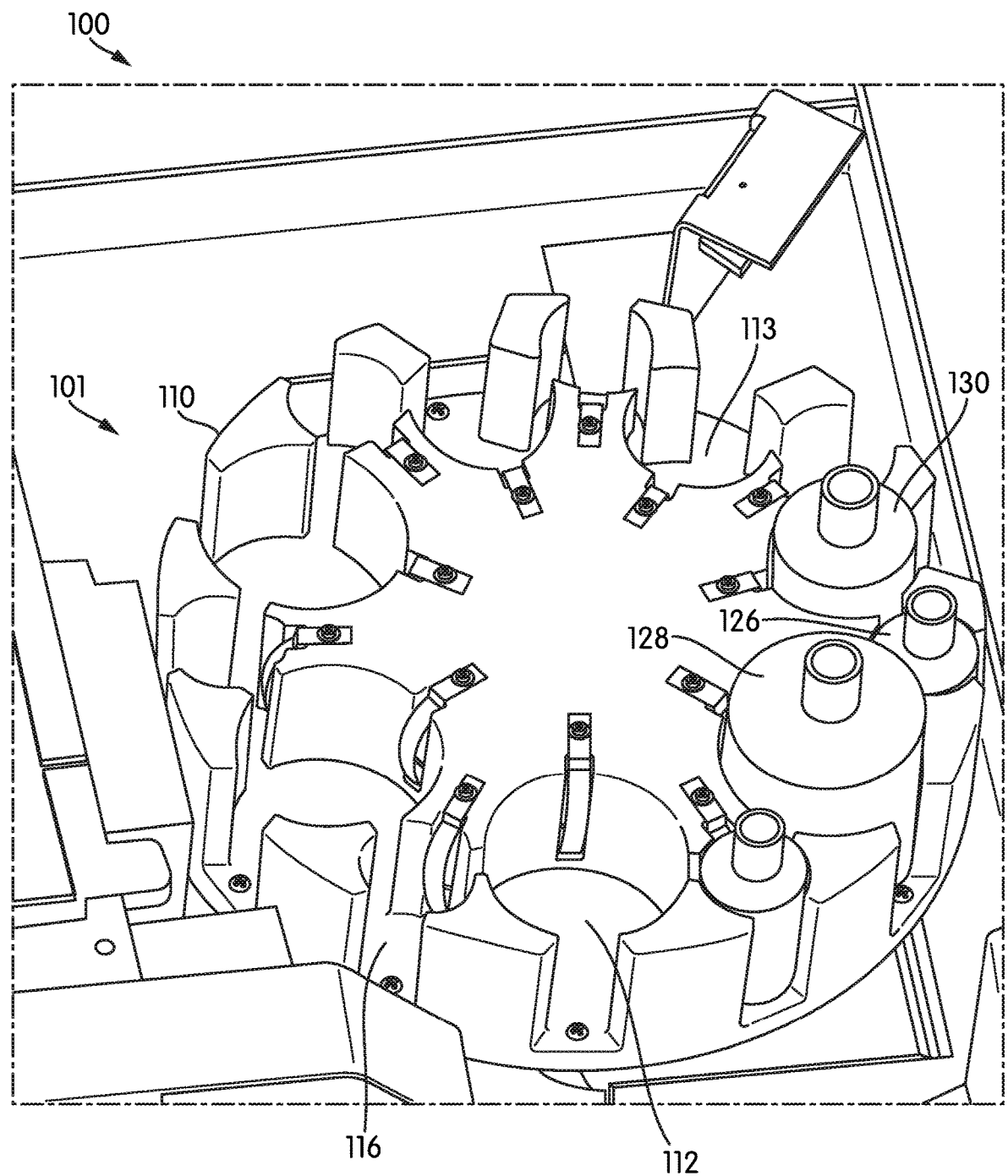
FIG. 1 is a top perspective view of a fluid container mixing apparatus, according to an example of the disclosure.
Figure 2:
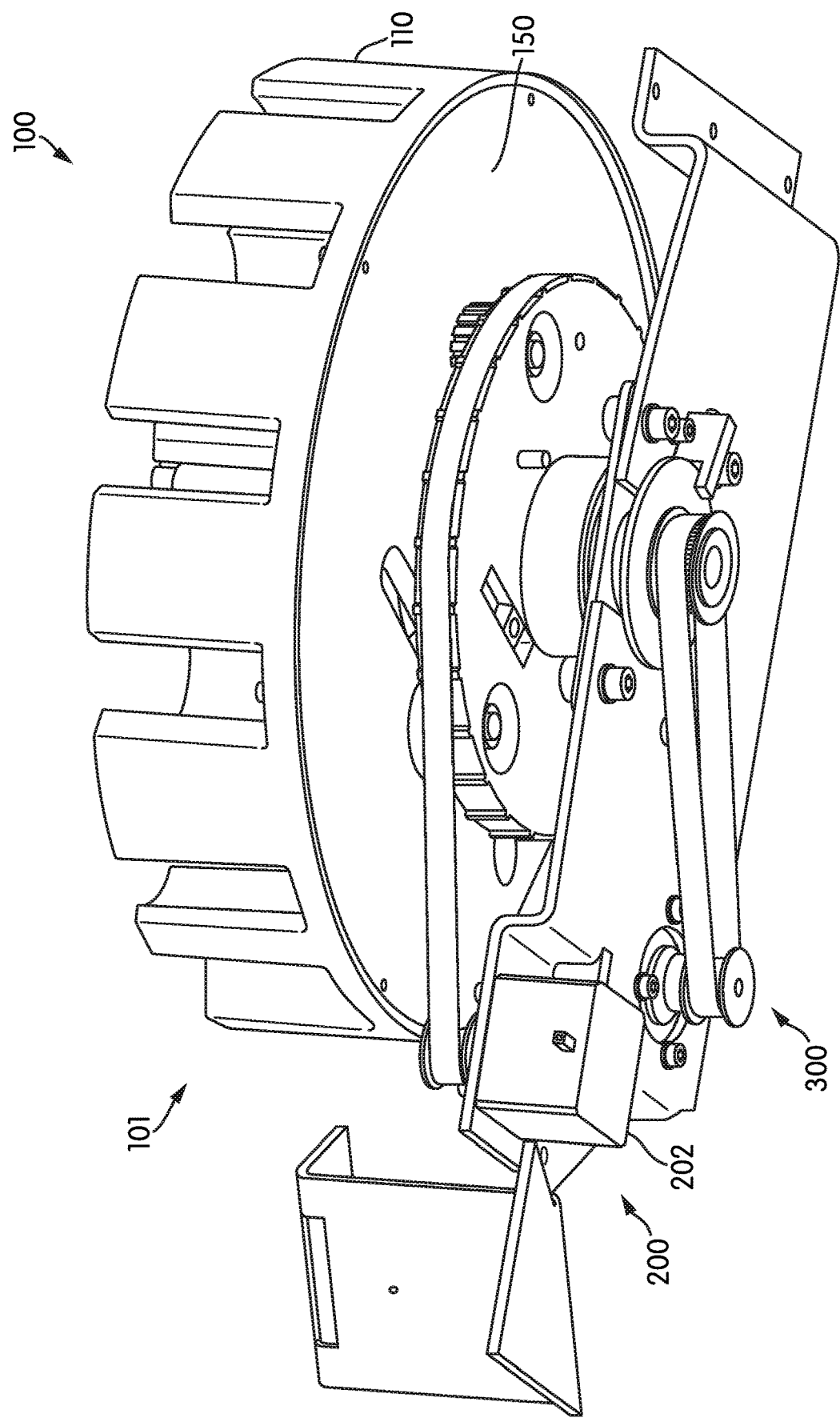
FIG. 2 is a bottom perspective view of the apparatus of FIG. 1.
Figure 3:
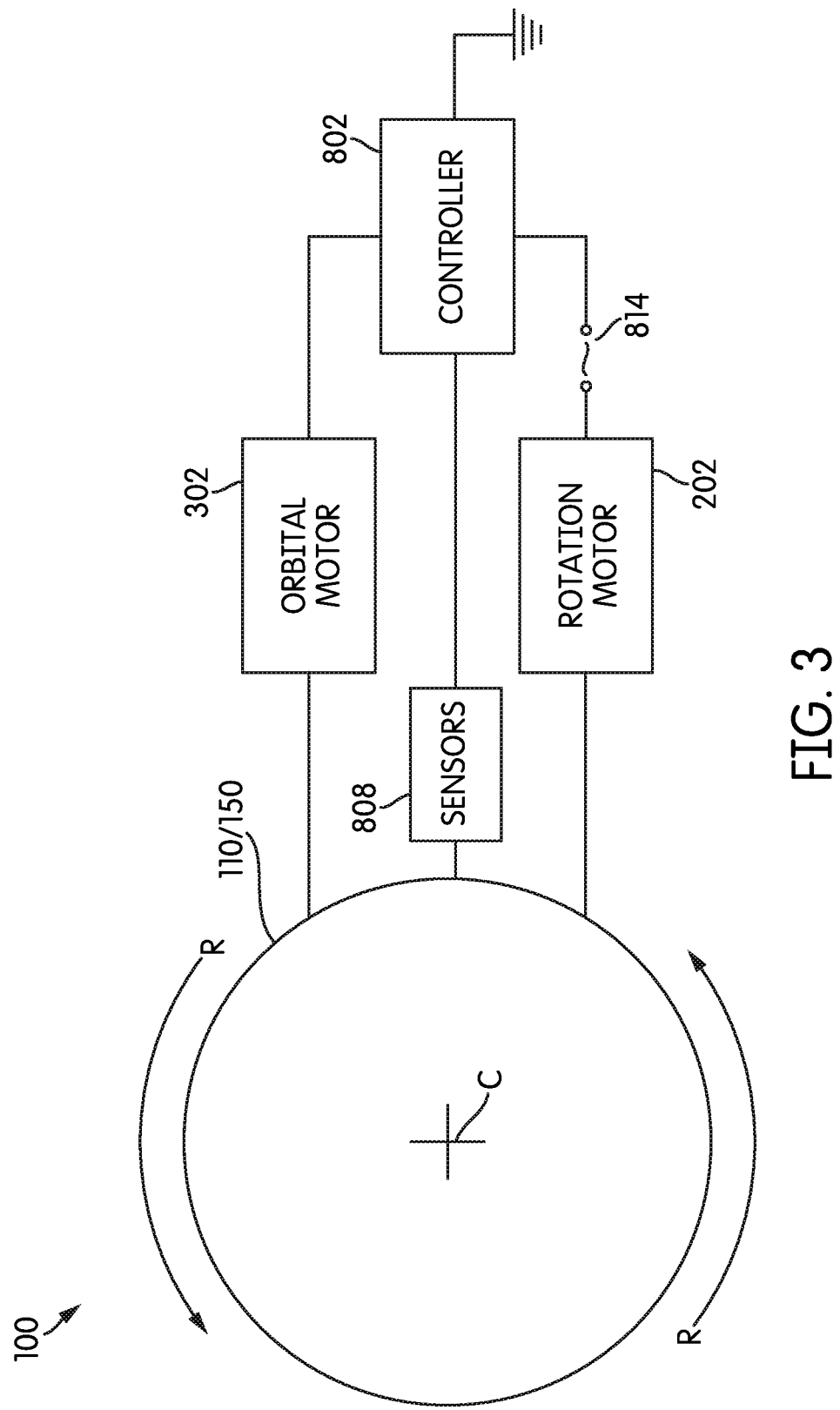
FIG. 3 is a schematic view of a power and control system of the apparatus of FIG. 1.

A fluid container mixing apparatus 100 is shown in FIGS. 1-3. The apparatus 100 may include a container support platform 101 configured to hold one or more containers. In the illustrated example, the container support platform 101 is rotatable about an axis of rotation, e.g., at the center of the platform 101. The container support platform 101 may include a container tray 110, configured to hold a plurality of fluid containers 126, 128, and 130, and a turntable 150 (shown in FIG. 2) to which container tray 110 is mounted, otherwise attached, or integral therewith.

Figure 4:
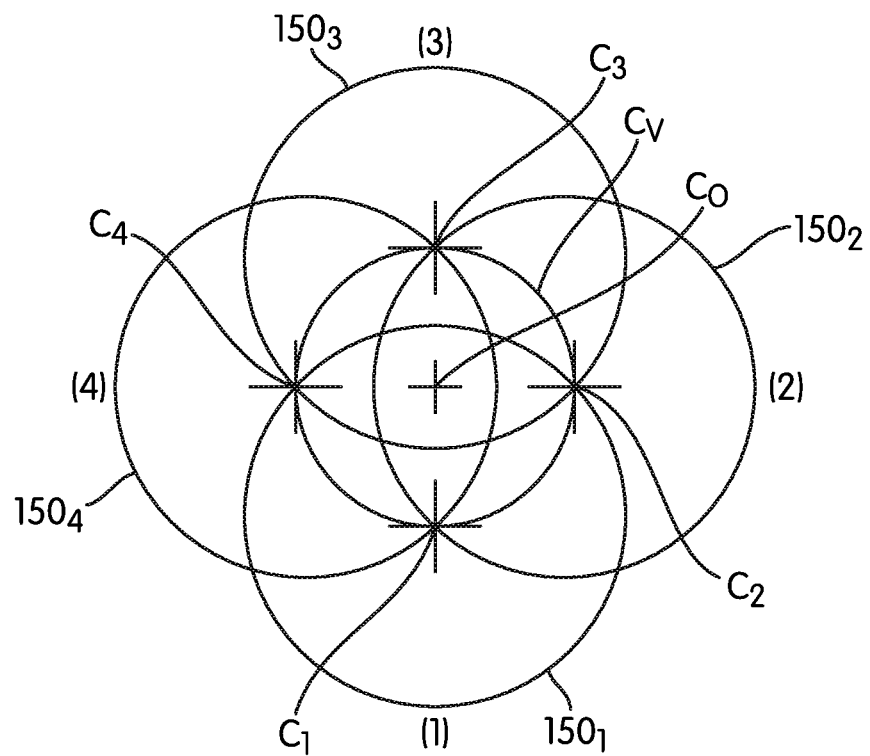
FIG. 4 is a schematic view of the orbital motion of a portion of the apparatus of FIG. 1.

Platform 101 also is configured to be movable in an orbital path about an orbital center that is, for example, offset from the center of platform 101. In the context of the present description, the terms orbit, orbital, or similar terms, when used to describe the motion of platform 101 (fluid container tray 110 and turntable 150), may refer to a path of motion whereby an entirety of platform 101 moves about an orbital center independently of the rotation or spinning of platform 101 about the central axis of rotation of platform 101. FIG. 4 illustrates the orbital motion of turntable 150. During the orbital motion, turntable 150 may be moved such that the center of turntable 150 orbits about a circle $C_P$ centered at an orbital center $C_O$. The center of turntable 150 moves through positions $C_1$, $C_2$, $C_3$, $C_4$ as turntable 150 moves through positions $150_1$, $150_2$, $150_3$, $150_4$.

As shown in FIG. 2, turntable 150 may include a circular disk configured to rotate about a central axis. In other examples, turntable 150 may have another shape configured to rotate about an axis that is generally perpendicular to the plane of turntable 150. Turntable 150 may be formed from any suitable material having sufficient strength, rigidity, and machinability, and that may be light in weight. Suitable exemplary materials include aluminum, stainless steel, or suitable plastics, including, e.g., polystyrene, polyvinyl chloride (PVC), polypropylene, and polyethylene, among others.

Apparatus 100 also may include a rotational drive system 200 (shown in FIG. 2) coupled to platform 101. Rotational drive system 200 is constructed and arranged to cause rotation or indexing of platform 101, as described in connection with FIG. 3. In the illustrated example, rotational drive system 200 may rotate platform 101 about an axis of rotation at the center of platform 101. Apparatus 100 also may include an orbital drive system 300 coupled to platform 101. Orbital drive system 300 is configured to cause orbital movement of platform 101, as described in connection with FIG. 4. Alternatively, apparatus 100 may include any other suitable drive system(s), orbital, rotational, or otherwise, for moving platform 101. For example, apparatus 100 may include motors and/or actuators similar to those in vortex mixers, orbital mixers, nutating mixers, overhead mixers, rolling mixers, and swinging mixers.

As shown in FIGS. 1 and 2, container tray 110 may include a plurality of cup-like, generally cylindrical container receptacles of varying sizes, such as larger container receptacles 112, smaller container receptacles 113, and even smaller container receptacles 116, configured to receive and hold containers (e.g., bottles) of varying sizes. For example, receptacles 112, 113, 116 may receive and hold large fluid containers 128, medium fluid containers 130, and small fluid containers 126, respectively. In addition, to accommodate different container sizes, separate drop-in adapters may be provided for receptacles 112, 113, 116. The adapters may permit the introduction and fixed placement of containers in receptacles 112, 113, 116 that have diameters that are smaller than the diameters of receptacles 112, 113, 116. Container tray 110 may be circular in shape, and the container receptacles 112, 113, 116, may be symmetrically disposed about a central axis of container tray 110. Container tray 110 may be formed of any suitable material, and, in one example, it is formed of molded plastic.

FIG. 3 is a schematic view of a control system for controlling operation of apparatus 100. As set forth above, apparatus 100 may be configured to provide, independently or simultaneously, rotation of the containers about a central axis and/or orbital movement of the containers to agitate fluid contents of the containers. The rotation of turntable 150 is shown in FIG. 3 by arrows R, which represents rotation of turntable 150 about the center C. The rotation of turntable 150 may be powered by drive system 200, and in particular, by drive motor 202. Orbital motion is powered by drive system 300 comprising a drive motor 302. Drive motors 202, 302 may be coupled to and controlled by a controller 802 that also is connected to a controllable power supply 814. Controller 802 may provide power and operational control signals to drive motors 202, 302. Controller 802 also may receive data from drive motors 202, 302 in the form of rotary encoder counts as well as other feedback sensor signals. Feedback sensors 808 may be coupled to apparatus 100, and may include, e.g., a rotational home flag, a position home flag, etc. Sensors 808 may be connected to the controller 802 for providing positional, or other status, feedback that is used in generating control signals for operating drive motors 202, 302.

Rotational drive system 200 and orbital drive system 300 may operate independently of each other such that platform 101 (container tray 110 and turntable 150) can be independently rotated about a central rotational axis, or caused to move about one or more orbital axes. Rotational drive system 200 and orbital drive system 300 also may operate simultaneously to rotate and move the platform 101 about an orbital path at the same time, which may facilitate improved mixing of the fluid contents of containers within container tray 110. Rotational drive system 200 may be substantially similar to the turntable drive system described in U.S. Patent Application Publication No. 2014/0263163. Orbital drive system 300 may be substantially similar to the vortex drive system described in U.S. Patent Application Publication No. 2014/0263163.

Aspects of the disclosure, such as controller 802 and one or more of the components controlled thereby, are implemented via control and computing hardware components, user-created software, data input components, and data output components. Hardware components include computing and control modules (e.g., system controller(s)), such as microprocessors and computers, configured to effect computational and/or control steps by receiving one or more input values, executing one or more algorithms stored on non-transitory machine-readable media (e.g., software) that provide instruction for manipulating or otherwise acting on the input values, and output one or more output values. Such outputs may be displayed or otherwise indicated to a user for providing information to the user, for example information as to the status of the instrument or a process being performed thereby, or such outputs may comprise inputs to other processes and/or control algorithms. Data input components comprise elements by which data is input for use by the control and computing hardware components. Such data inputs may comprise position sensors, motor encoders, as well as manual input elements, such as keyboards, touch screens, microphones, switches, manually operated scanners, etc. Data output components may comprise hard drives or other storage media, monitors, printers, indicator lights, or audible signal elements (e.g., buzzer, horn, bell, etc.). Software comprises instructions stored on non-transitory computer-readable media which, when executed by the control and computing hardware, cause the control and computing hardware to perform one or more automated or semiautomated processes.

Containers and Inserts

The fluid contents of containers 126, 128, 130 carried on container tray 110 of the mixing apparatus 100 may comprise fluid solutions and/or fluid suspensions. Representative fluid contents may comprise reagents containing solid supports, such as silica or magnetically-responsive particles or beads. See, e.g., U.S. Pat. Nos. 5,234,809 and 6,534,273. The solid supports may have a diameter from about 0.68 to about 1.00 µm. Such solid supports can be useful for immobilizing nucleic acids in a sample processing procedure to remove inhibitors of amplification and/or detection. Other suitable reagents include, e.g., target enhancing reagents used for alkaline shock treatment as described U.S. Pat. No. 8,420,317. As discussed elsewhere in this disclosure, mixing of the fluid contents, e.g., by agitating the container containing the fluid contents, may help to maintain the suspended materials in suspension within the fluid and/or re-suspend materials that have precipitated or otherwise come out of solution/suspension. Other suitable reagents may include those used in ChargeSwitch® nucleic acid purification kits provided by Thermo Fisher Scientific®, and those described in U.S. Patent Application Publication No. 2006/0084089. Even in the absence of suspended particles or solid supports, it may be possible for one or more components of a fluid solution to precipitate out of solution, potentially affecting the concentration of the solution that is drawn out of the container. Even small changes in concentrations can have an adverse effect on a test or assay performed with such solutions.

The containers may be carried in an open state to permit ready access to the fluid contents of each of the containers by a fluid extraction device having a probe tip, such as a robotic pipettor. In other examples, the containers may be sealed and/or include a filter or septum to limit aerosol dissemination of the reagent, and to further control for evaporation of the reagent. The fluid extraction device having a probe tip may access the fluid contents of the container to aspirate or otherwise extract fluid from the container and/or to dispense additional fluid into the container. The fluid extraction device having a probe tip may include a pipettor configured to detect a fluid surface within the container, e.g., for the purpose of determining or verifying the height of the fluid within the container, which can be used to calculate the volume of fluid remaining in the container. Suitable pipettors for this purpose are disclosed by U.S. Pat. No. 6,914,555. Level sensing, including, for example, capacitive level sensing, also may be used to signal that an aspiration step may be initiated, or to signal for the initiation of the aspiration step for aspirating at least a portion of the fluid contents of a container. For example, once the surface of a liquid is detected, the pipettor may continue along a downward path as liquid is aspirated from the container. Alternatively, after the surface of a liquid is detected, the pipettor may descend a predetermined distance before aspiration is initiated. In the latter approach, the pipettor may remain stationary during aspiration. The pipettor may employ at least one or more of capacitive liquid level detection (cLLD) and pressure-based liquid level detection (pLLD). Capacitive liquid level detection may be performed with the use of a conductive, disposable pipette tip mounted on a tip holder of the pipettor. Additionally or alternatively, the pipettor may include one or more sensors for identifying irregularities, such as the presence of foam in dispensed or aspirated fluid, by detecting discontinuities in fluid flow through the pipettor and/or by detecting irregularities in a pressure signal, as disclosed by U.S. Pat. No. 6,914,555.

Figure 5:
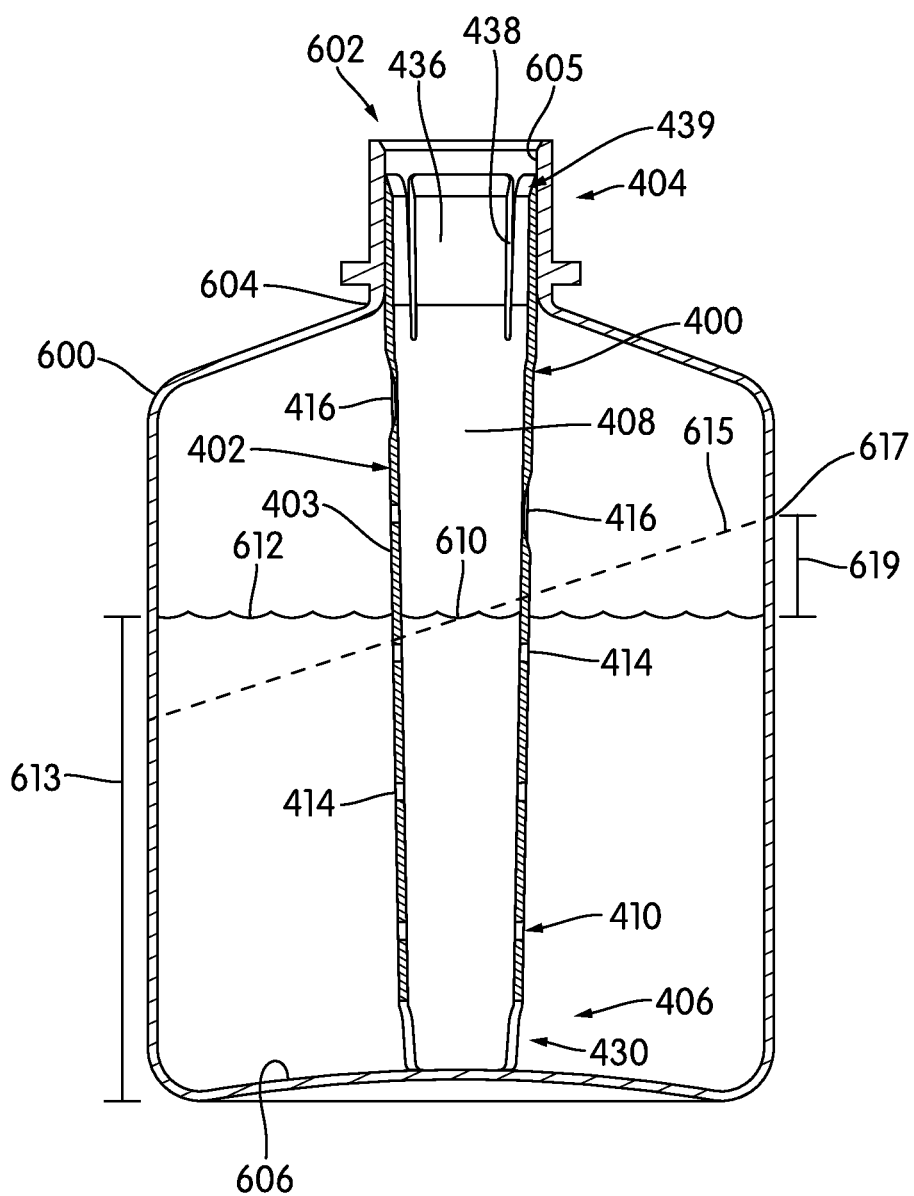
FIG. 5 is a cross-sectional view of an insert and a container partially filled with fluid contents, according to an example of the disclosure.
Figure 6:
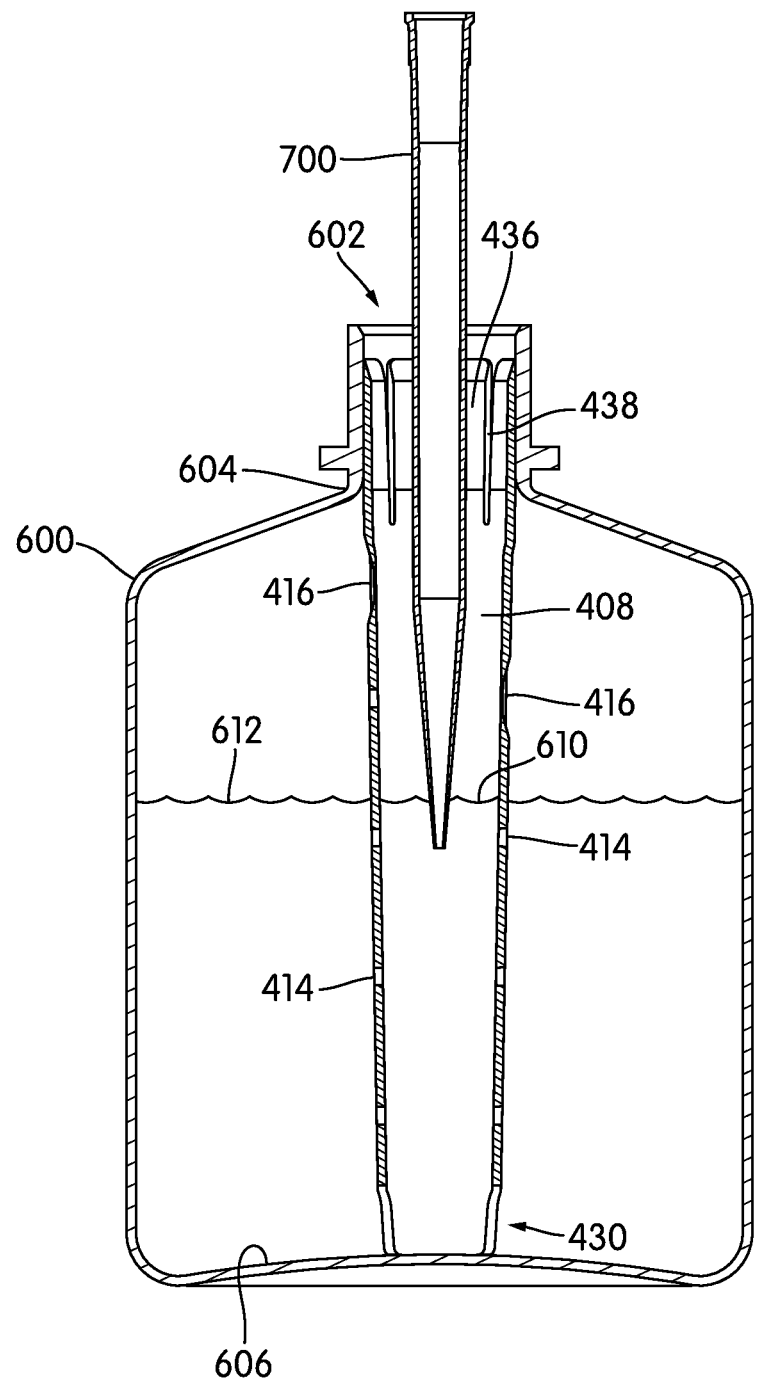
FIG. 6 is a cross-sectional view of the insert, container, and fluid contents of FIG. 5, and a pipette tip, according to an example of the disclosure.

When the containers are in an open state, the fluid contents of the containers are exposed to the atmosphere and, therefore, are susceptible to evaporation. Mixing may exacerbate this problem, as mixing results in increased exposure of a fluid surface of the fluid contents to the atmosphere, thereby potentially accelerating the rate of evaporation. An evaporation-limiting insert 400 for reducing the amount of evaporation from a container, e.g., container 600, is shown in FIGS. 5 and 6. Insert 400 may include the features of the insert disclosed in U.S. Provisional Application No. 62/466,856, filed on Mar. 3, 2017. Use of insert 400 is, in some instances, optional.

Insert 400 may include a body 402 having a wall 403 extending from a first (top) end 404 toward a second (bottom) end 406. A lumen 408 may extend through body 402 from first end 404 to second end 406. First end 404 and second end 406 each may be open and in communication with lumen 408. Body 400 may include a plurality of openings extending through the wall 403. Each of the plurality of openings may extend into lumen 408. Body 400 may include, for example, one or more rows of openings 414, 416. Openings 414, 416 may have different sizes and/or shapes. An opening may be a through-hole. Any suitable number of openings 410 may be included on insert 400. However, while a greater number of openings may improve mixing of reagent within insert 400 and container 600, a greater number of openings also may increase evaporation relative to a design with fewer openings. It also is contemplated that at least one opening is disposed below a top fluid line of the reagent within the container 600 to facilitate mixing of the reagent.

Insert 400 may include one or more axial slots 430 extending from second end 406 toward first end 404. In various examples, insert 400 may include one or more resilient tabs 436 defined by one or more slits 438 extending from first end 404 toward second end 406. The tabs 436 may be configured to flex radially inward in response to a radially-inward directed force (e.g., when insert 400 is inserted into the opening of container 600). When flexed radially inwardly, the tabs may apply a radially outward directed force that may help secure insert 400 within container 600. Additionally or alternatively to the tab and slit arrangement described above, insert 400 may include one or more detents (not shown) that may engage an inner surface of container 600, including detents described in U.S. Patent Application Publication No. 2014/0263163. For example, the one or more detents may engage with corresponding recesses located on the inner surface of container 600. Other suitable retention features are also contemplated, including, for example, snap fit arrangements, friction fit arrangements, latches, and the like. In some examples, one or more of the tabs 436 may include a beveled top surface 439. Beveled top surface 439 may assist the insertion of a pipette tip, or other device of substance, into container 600. Without the bevel, it is possible that pipette tip 700 could contact a top ledge of insert 400 when directing pipette tip 700 into insert 400.

Insert 400 is shown positioned within container 600 in FIG. 6. Insert 400 may be inserted into container 600 through an opening 602 at the top of a neck 604 of container 600. As shown in FIGS. 5 and 6, first end 404 of insert 400 may be disposed adjacent to container neck 604 and second end 406 of insert 400 may be in contact with a bottom surface 606 of container 600. Slot(s) 430 of container insert 400 may prevent bottom second end 406 of insert 400 from forming a sealing contact with the bottom surface 606 of the container 600.

In various examples, when insert 400 is fully inserted into a container 600, the lower end of each slit 438 separating a pair of tabs 436 may extend below neck 604 of container 600, thereby creating a small vent just below neck 604 of container 600. The small vents may help prevent a vacuum from forming in container 600, and may permit air to escape from the container 600 when it is being filled with liquid. The resilience of the tabs 436, or a bias of the tabs in the radial outward direction may push tabs 436 against the inner surface 605 of a neck 604 of container 600 to secure insert 400 within container 600.

Openings 414, 416 and slots 430 of insert 400 may allow fluid within the container 600, including solid supports in suspension, to flow between the space inside insert 400 (e.g., lumen 408) and the space outside insert 400 within container 600. The second openings 416 may be resistant to the formation of films, and may help prevent a vacuum from forming inside of container 600. This may help ensure that the top fluid level 610 inside of insert 400 is at substantially the same height as the top fluid level 612 outside of insert 400 and within container 600. As used herein, "solid support" may refer to a solid substance or object of any geometry sufficient to pass through first openings 414 of insert 400. The solid support may include any material that does not appreciably dissolve in a fluid medium in which it is contained. Examples of solid support materials include metal, silica, glass, rubber, and plastics. In some embodiments, the solid support is formed from or includes a magnetically-responsive material. In other embodiments, the solid support may be adapted to bind an analyte of interest. The solid support may be in particle or bead form.

Fluid levels 610, 612 may define a fluid surface of the fluid contents in container 600. A resting height 613 may be a distance between a bottom of container 600 and the fluid surface. During mixing, the fluid contents in container 600 may swirl around container 600 in the form of a wave propagating in a circular path along the interior wall of container 600. Such a wave is represented using a dashed line 615 in FIG. 5. A peak 617 of the wave 615 rises a distance above the resting height 613 of the fluid contents. That distance between the peak 617 and the resting height 613 is an amplitude 619 of the wave 615. The magnitude of the amplitude 619 is indicative of the level of mixing undergone by the fluid contents in that a larger amplitude is indicative of more movement/agitation of the fluid contents than a smaller amplitude.

Methods

Figure 7:
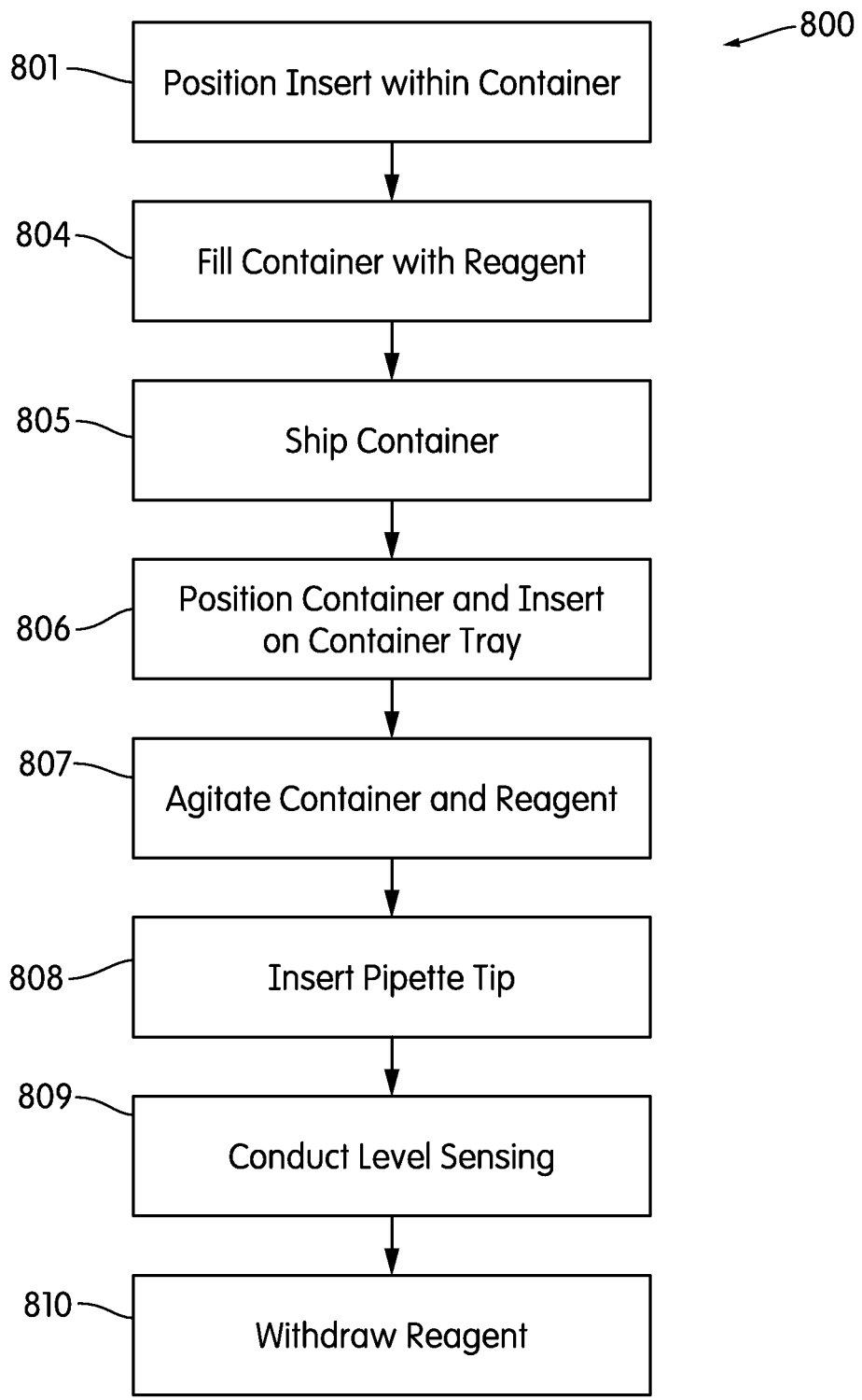
FIG. 7 is a flowchart of a method according to an example of the present disclosure.

A method 800 according to the present disclosure is shown in FIG. 7. Method 800 may begin at step 801, where insert 400 may be positioned inside of container 600. Method 800 may proceed to step 804, where container 600 is filled with reagent. It is contemplated that the order of steps 801 and 804 may be interchangeable. Method 800 may optionally proceed to step 805, where container 600 is sealed and shipped, for example, to a distributor or end-user. Steps 801, 804, and 805 may be performed by a manufacturer, before steps performed by an end-user or by a machine operated by an end-user. The following steps of method 800 therefore may be separate steps of a method independent of steps 801, 804, and 805.

Method 800 may proceed to step 806, where container 600 and insert 400 may be positioned within container tray 110 (referring to FIG. 1). Alternatively, container 600, with insert 400, may be positioned within container tray 110 without containing any fluid therein. In this example, container 600 may be filled with reagent after it is positioned within container tray 110. Container tray 110 may have thereon a plurality of containers of different sizes and/or fill levels.

Method 800 then may proceed to step 807, where the fluid contents of one or more containers 600 in container tray 110 may be mixed and/or agitated by rotation, orbital movement, inversion, vibration, and/or another suitable mixing motion. After mixing, the concentration of a fluid and/or a distribution of solid supports within a fluid may be substantially the same (uniform) both inside and outside of insert 400. Alternatively, the concentration may not necessarily be substantially uniform, but rather, may be partially-mixed. Mixing effectiveness may be empirically evaluated by, for example, taking optical density measurements with aliquots of the fluid contents taken from within a container insert following agitation of a container. The optical density measurements of these aliquots will be similar if the solutes are in solution and/or the solid supports are uniformly distributed within the fluid contents. Mixing effectiveness also may be performed using chemical reaction methods and other suitable processes. For example, samples of fluid contents may be taken from different regions of a container and tested for their absorbance using spectrophotometry. The absorbance may then be compared to determine if there is a difference in concentration between the samples.

As used herein, "desired mixing effectiveness" applies to situations where a substantially uniform concentration (e.g., homogeneity) is achieved for fluid contents of a container, as well as to other situations where substantially uniform concentration is not achieved but a threshold level of mixing is reached. The threshold level of mixing of material may be indicative of, for example, a concentration (or concentration profile) that differs from homogeneity only to an extent that does not affect results so severely that they exceed an acceptable margin of error (e.g., ±5% of a true value, but the margin may be different in different contexts) when the material is in its intended use. If a desired mixing effectiveness is not achieved, a sub-optimal concentration of solute may form inside bottle 600 and/or insert 400, and/or a sub-optimal concentration of solid supports may form inside bottle 600 and/or insert 400. As used here, the phrase "sub-optimal concentration" means the concentration is either too high or too low, potentially resulting in results falling outside of the acceptable margin of error. If, for example, a reagent is not properly/sufficiently mixed, then samples being processed using the reagent will receive varying concentrations of the reagent, which could lead to differences in assay performance. So that the results of assays are comparable, it is desirable for each sample to receive the same concentration of a reagent.

On the other hand, if excess agitation is performed (i.e., agitation that occurs past the point where desired mixing effectiveness is achieved), the excess agitation may result in higher evaporation rates, sloshing (i.e., fluid material being swirled outside of the container), and/or a higher potential for the formation of foam inside container 600 and/or insert 400. Sub-optimal concentrations, evaporation, sloshing, and foam formation may negatively affect level sensing and/or accurate aspiration. For example, if pipettor-based level sensing is employed, contact between the pipette tip and the foam, which may form a foam on the fluid surface of fluid contents in insert 400, could signal an incorrect position of the fluid surface, and an associated analyzer could prematurely initiate an aspiration step before the pipette tip has actually contacted the fluid surface. In addition, the presence of foam may result in foam being drawn into the pipettor with the fluid, thereby inhibiting accurate aspiration of a volume of the fluid.

Method 800 may proceed to step 808, where pipette tip 700 and an associated fluid extraction device having a probe tip (e.g., an automated pipettor) may be inserted into container 600. Method 800 then may proceed to step 809, where level sensing may be conducted to signal that the pipette tip 700 has come into contact with reagent within container 600. Once it is determined that pipette tip 700 has come into contact with reagent, pipette tip 700 and the associated fluid extraction device having a probe tip may aspirate an amount of a reagent from one of the containers 600. Pipette tip 700 may aspirate reagent from a container 600 at the same location each time an aliquot of reagent is aspirated. The aspirated reagent may be used in one or more assays or other analytical procedures performed by the automatic analyzer. Analytical procedures may include any procedure for determining the presence of analytes in a sample, including, for example, nucleic acid based assays, immunoassays, chemical assays, and the like. Examples of automatic analyzers include those describe in U.S. Pat. No. 9,598,723 and U.S. Patent Application Publication No. US 2016/0060680 A1.

After an amount of reagent is aspirated in step 810, method 800 may proceed to an optional step (not shown in FIG. 7), where a determination is made whether a sensed fluid level of container 600 is above a minimum threshold fluid level (corresponding to a dead volume, below which a container is no longer useful). The determination may be made by any suitable mechanism, such as, e.g., one or more fluid level sensing techniques, including capacitive level sensing and/or any of the techniques described in U.S. Pat. No. 6,914,555. If the sensed fluid level is above the minimum threshold value, method 800 may return to step 807 to mix and/or agitate the contents of container 600. If the sensed fluid level is below the minimum threshold, container 600 may be refilled with reagent or replaced with a new container 600.

In step 806, container 600 may be positioned within container tray 110 with one or more other containers. For example, container 600 may be one of containers 126, 128, 130 within container tray 110 (shown in FIG. 1). In some instances, container tray 110 may be fully filled with containers (i.e., each receptacle 112, 113, 116 includes a container 126, 128, 130). Because the containers within container tray 110 have one or more different characteristics (e.g., geometries, fill levels, fluid content viscosity, fluid content composition, etc.), it is possible that mixing the fluid contents of all of the containers simultaneously in a way that produces a desired mixing effectiveness for the fluid contents of one container may result in inadequate mixing of the fluid contents of another container and/or excessive agitation of the fluid contents of another container. In such cases, a multi-phase mixing procedure may be performed on the containers in step 807, with the goal of achieving an overall desired mixing effectiveness (e.g., a condition where a desired mixing effectiveness is achieved for fluid contents of each of the containers). The multi-phase mixing procedure may be optimized to minimize the amount of mixing required to achieve the overall desired mixing effectiveness, thereby minimizing evaporation of, sloshing of, and/or the formation of foam in, the fluid contents being mixed.

Figure 8:
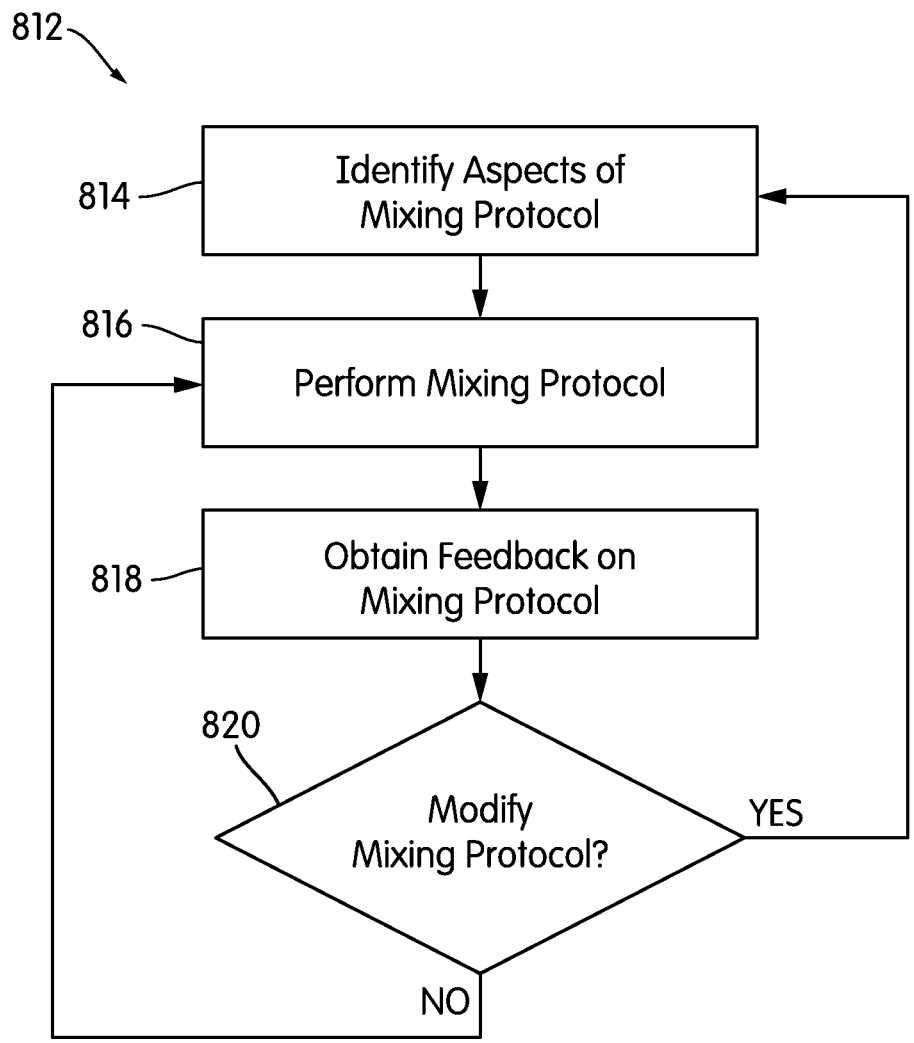
FIG. 8 is another flowchart of a method according to an example of the present disclosure.

A method 812, shown in FIG. 8, describes exemplary steps for implementing a multi-phase mixing procedure. Method 812 may be performed apart from or in conjunction with all or a portion of method 800. For example, a step 814 in method 812 may be performed at any point prior to step 807 in method 800. Step 814 includes identifying aspects of phases of the multi-phase mixing procedure. This may include, for example, identifying a first set of rates at which one container is movable in a mixing motion to result in a first set of values indicative of the effectiveness of the mixing motion at mixing the fluid contents in that container. Step 814 also may include identifying at least one additional set of rates at which at least one other container is movable in the mixing motion to result in at least one additional set of values indicative of the effectiveness of the mixing motion at mixing the fluid contents in the at least one other container. A set of rates at which a container in container tray 110 is movable in a mixing motion may include, for example, a plurality of frequencies (including discrete frequencies and/or ranges of frequencies) at which the container is rotatable by one or more of orbital drive system 300 and rotational drive system 200 (shown in FIGS. 2 and 3). Additionally or alternatively, the set of rates may include a plurality of speeds and/or frequencies (including discrete values and/or ranges) at which the container is movable by a vortex mixer, an orbital mixer, a nutating mixer, an overhead mixer, a rolling mixer, a swinging mixer, and the like. A set of values indicative of the effectiveness of the mixing motion at mixing the fluid contents in the container may include, for example, a plurality of amplitudes 619 (shown in FIG. 5) of the wave propagating around the inside of the container as a result of the mixing motion.

Figure 9A:
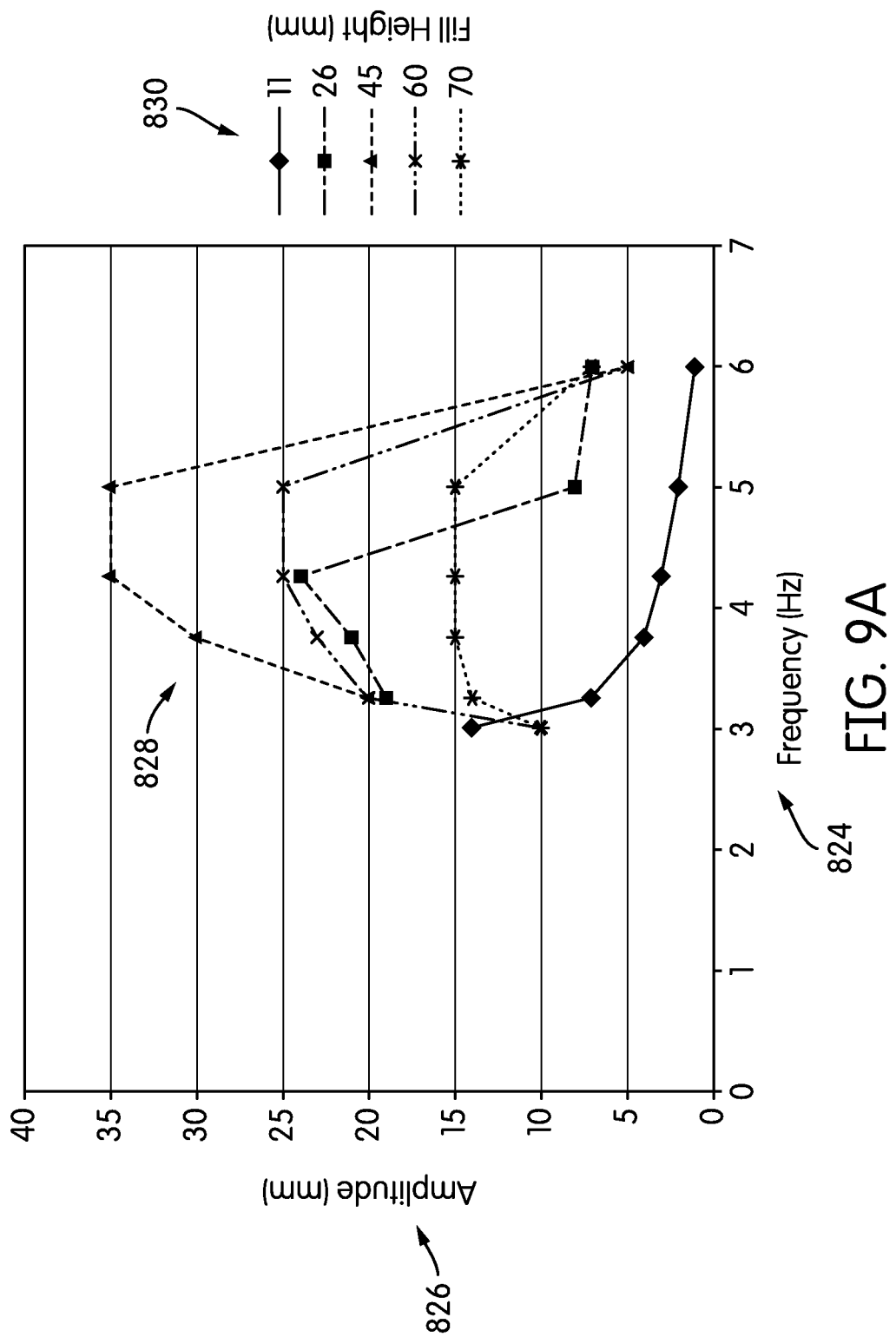
FIGS. 9A-9C are graphs showing data associated with a step in the flowchart of FIG. 8 according to an example of the present disclosure.
Figure 9B:
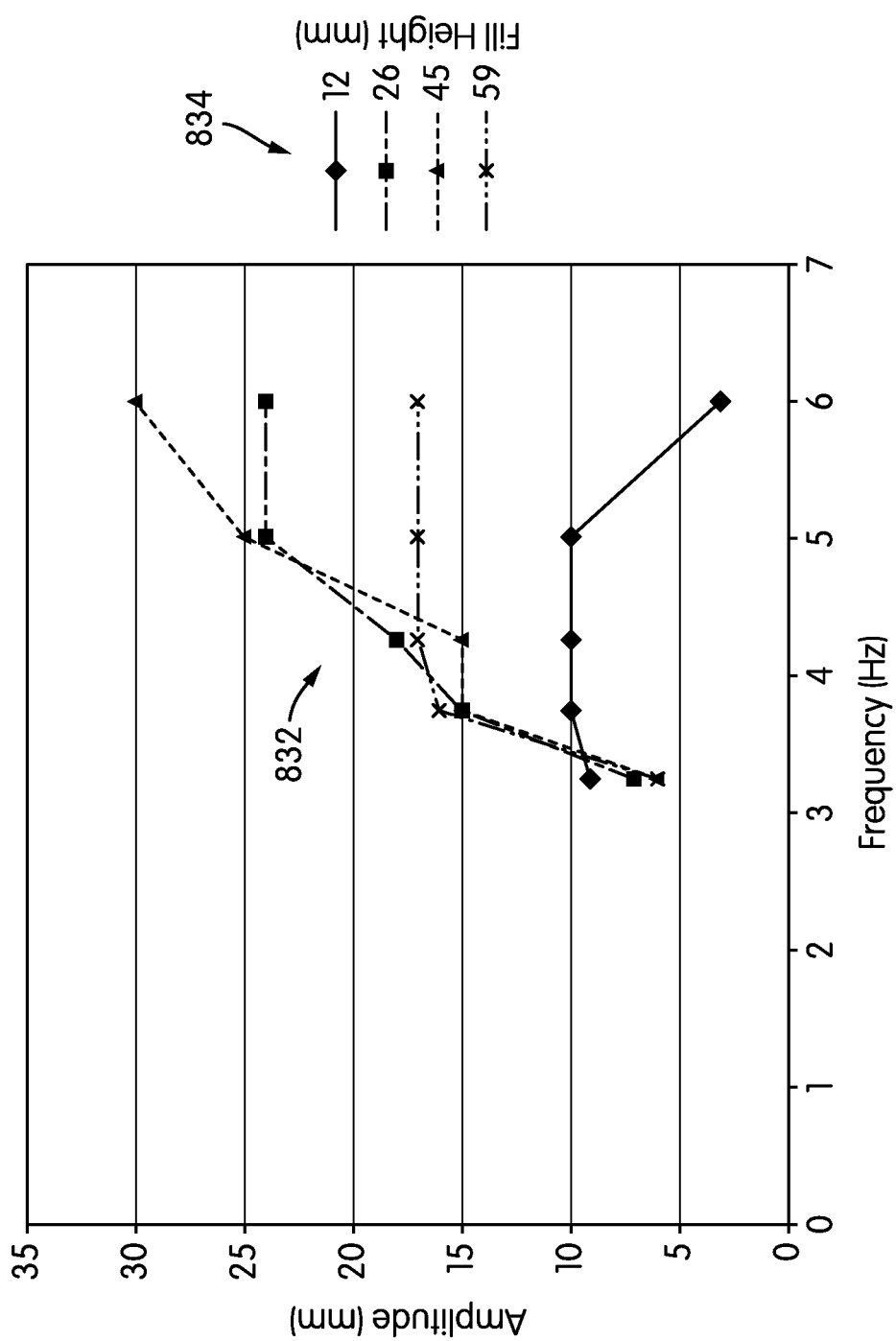
Figure 9C:
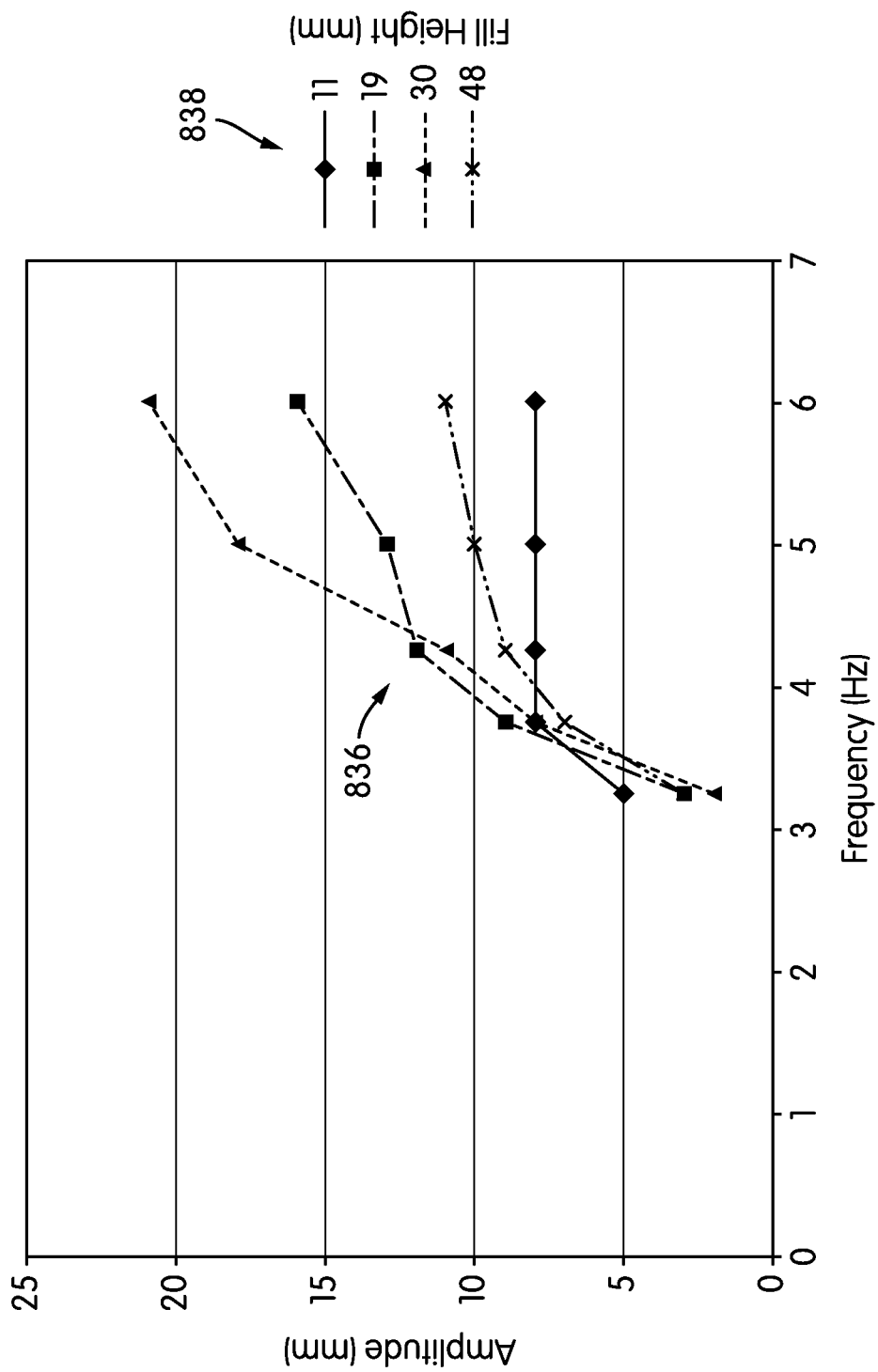

FIGS. 9A-9C depict graphs showing examples of the sets of rates and sets of values described above. More specifically, FIG. 9A shows, along its x-axis, frequencies 824 ranging from 3 Hz to 6 Hz, at which a large container (e.g., a 280 mL bottle having a diameter of 72 mm) of target capture reagent (TCR) containing a magnetically-responsive solid support material is movable in a mixing motion by orbital drive system 300. FIG. 9A shows, along its y-axis, amplitude values 826 indicative of the effectiveness of the mixing motion at agitating the fluid contents of the large container. Curves 828 show amplitude as a function of frequency for the large container when the fluid contents of the large container are at different fill heights 830 ranging from 11 mm to 70 mm. FIGS. 9B and 9C show graphs similar to the graph in FIG. 9A, with curves 832 in FIG. 9B showing amplitude as a function of frequency for a medium container (e.g., a 125 mL bottle having a 50 mm diameter) at different fill heights 834 ranging from 12 mm to 59 mm, and curves 836 in FIG. 9C showing amplitude as a function of frequency for a small container (e.g., a 60 mL bottle having a 35 mm diameter) at different fill heights 838 ranging from 11 mm to 48 mm. The x-values of the curves in each of the graphs may be viewed as the set of rates for the containers of one of the container sizes (i.e., large, medium, or small), and the y-values of the curves may be viewed as the set of rates for the containers of that size.

Some or all of the data shown in FIGS. 9A-9C, and/or similar data for any other containers, may be received by, or otherwise stored in, controller 802. For example, the data may be programmed into controller 802 before mixing apparatus 100 is provided to a user. Additionally or alternatively, the data may be entered into controller 802 by the user. Additionally or alternatively, the data may be electronically transmitted (e.g., uploaded) to controller 802 from an external source through a network like the Internet. Additionally or alternatively, the data may be captured from the containers themselves by controller 802, using a scanner, sensor, or similar device to read data off of labels or transmitters on the containers. Additionally or alternatively, controller 802 may generate the data by performing the mixing motion on the containers at multiple frequencies and tracking the resultant amplitudes of their swirling liquid contents, and then storing the generated data for later use.

Step 814 also may include selecting, identifying, or otherwise establishing a rate, from each of the sets of rates, at which to perform the mixing motion. The rate may be, for example, a frequency of the mixing motion that results in an amplitude reaching a maximum value or a predetermined threshold indicative of a desired mixing effectiveness. Multiple rates may be used when different types of containers are present. For example, different rates may be used for mixing the fluid contents of each type of container in container tray 110. Containers may be grouped into types based on their sizes. Alternatively, containers may be grouped into types based on any combination of their sizes, fill heights, and/or contents.

Additionally or alternatively, the rate may be, for example, a frequency of the mixing motion that results in maximum amplitudes for the fluid contents in two or more types of containers, a maximum amplitude for one or more of the types of container and an amplitude that reaches a predetermined threshold for one or more of the other types of container, or amplitudes for the two or more types of containers that meet predetermined thresholds. Additionally or alternatively, the rate may be a frequency of the mixing motion that results in maximizing the amplitudes of the fluid contents of as many types of containers as possible. Multiple rates may be used in instances where a single rate is inadequate. One example of this is where a first desired mixing effectiveness is achieved for a first type of container at a first rate, the first desired mixing effectiveness is not achieved for the first type of container at a second rate different from the first rate, a second desired mixing effectiveness is achieved for a second type of container at the second rate, the second mixing effectiveness is not achieved for the second type of container at the first rate, and thus, the first rate and the second rate become part of the multi-phase mixing procedure. Additionally or alternatively, the rate may be, for example, a frequency of the mixing motion that is an average (e.g., mean, median, or mode) of two or more frequencies of the mixing motion. In many instances, a magnitude of the rate may be directly proportional to the size of a container. In other words, the fluid contents of larger containers tend to be more uniformly mixed at lower rates, while the fluid contents of smaller containers tend to be more uniformly mixed at higher rates. Each of the rates may be associated with a mixing phase of the mixing procedure.

Step 814 of method 812 also may include selecting, identifying, or otherwise establishing a time period for each of the rates, the time period defining how long the mixing motion is to be performed at each of the rates. A time period may include, for example, the minimum amount of time needed to ensure that a desired mixing effectiveness is achieved when mixing the contents of a container at a rate. The magnitude of the time period may be inversely proportional to the magnitude of the rate. In other words, the time periods may be shorter for higher rates, and may be longer for shorter rates. Together, the rates and their corresponding time periods define mixing phases of the mixing procedure. The time periods may be, for example, about 5 seconds or longer, during which time the frequency and/or speed of rotation of a container remains substantially constant at the rate.

While the above-outlined example describes using one rate associated with each type of container, it is contemplated that method 812 may include using multiple rates for any given type of container, such as a plurality of discrete rates and/or a continuous range of rates. During a mixing phase, the mixing motion may be carried out at the plurality of discrete rates and/or over the continuous range of rates during the established time period (e.g., a period of time 5 seconds or longer). The determination on whether to use one rate for a container, or multiple rates for the container, may be based on factors including container volume, the viscosity of its fluid contents, and the like.

Step 814 also may include establishing a time period for a non-mixing phase of the multi-phase mixing procedure. In the non-mixing phase, the mixing motion may be stopped (there is no mixing motion). For example, orbital drive system 300 may be stopped, and may not be started again until the next mixing phase. Even when there is no mixing motion, controller 802 may perform non-mixing movements (e.g., movements that do not constitute mixing motions) of the containers to, for example, position the containers for pipetting and/or move the containers to a pipetting station. For example, non-mixing movements may include movements that do not follow the path of the mixing motion and/or occur at a lesser rate and for less time than the movement of the mixing motion.

The top surfaces of fluid contents of the containers may have amplitudes of about zero during the non-mixing movements. The non-mixing phase may be a single continuous phase of the multi-phase mixing procedure that takes place after all of the mixing phases have been performed. Alternatively, there may be multiple non-mixing phases in a multi-phase mixing procedure, with at least one of those non-mixing phases taking place between two mixing phases. The non-mixing phases may have the same or different durations, depending on how much time is needed to aspirate the fluid contents from the containers and/or reduce the amount of foam in the fluid contents.

Step 814 also may include establishing an order in which to perform the mixing and non-mixing phases of the multi-phase mixing procedure. In one example, mixing phases with higher rates may be performed before mixing phases with lower rates. One reason for this is that foam formed during mixing at higher rates may move to a perimeter of a fluid surface during mixing at lower rates, resulting in less foam being present in a central region of the fluid surface, which is where a pipettor may aspirate an amount of the fluid material.

In some instances, the multi-phase mixing procedure may include different mixing cycles, each cycle including multiple mixing phases and at least one non-mixing phase. For example, the mixing procedure may include a first cycle of mixing phases and at least one non-mixing phase, the mixing phases having characteristics selected to perform initial mixing of fluid contents in containers. The mixing procedure may include a second cycle of mixing phases and one or more non-mixing phases, the mixing phases being selected to mix fluid contents of containers previously mixed in the first cycle (e.g., preferably before any solutes precipitate out of solution and/or solid supports settle out). The rates and time periods of the phases in the first cycle may result in a greater degree of agitation of the fluid contents of the containers than those of the second cycle. One or more aspects of the second cycle may differ from the first cycle to ensure that unnecessary mixing is avoided. For example, in the second cycle, one or more of the rates of the mixing phases may be decreased, one or more of the time periods of the mixing phases may be decreased, and/or the time period (s) of the one or more non-mixing phases may be altered. The appropriate cycle may be selected and used when the mixing procedure is performed in step 816. It is also contemplated that similar changes between mixing cycles may be implemented in response to any changes in fluid levels of containers during aspiration of fluid contents from any containers during the non-mixing phase of the earlier of the two cycles.

In step 816 of method 812, which may take place during step 807 of method 800, the multi-phase mixing procedure is performed. Where multiple types of containers are within container tray 110, performance of the multi-phase mixing procedure may include carrying out multiple mixing phases, and at least one non-mixing phase. The phases may be performed by controller 802 through its control of, for example, rotational drive system 200 and/or orbital drive system 300, or alternatively, motors and/or actuators similar to those in vortex mixers, orbital mixers, nutating mixers, overhead mixers, rolling mixers, and swinging mixers.

In step 818 of method 812, which may take place during step 808 of method 800 or any point downstream, feedback may be obtained that is indicative of the effectiveness of the multi-phase mixing procedure. The feedback may be provided by one or more sensors either on the pipettor, on a separate instrument, or otherwise positioned in the environment around the containers. The feedback may include data on, for example, the formation of precipitates and/or the degree to which a solid support is uniformly dispersed within a fluid. Additionally or alternatively, the feedback may include data on the formation or presence of foam in the containers.

In step 820 of method 812, which also may take place during step 808 of method 800 or any point afterwards, controller 802 may be programmed to modify the multi-phase mixing procedure based on the feedback data. For example, if the feedback data indicates that the degree of uniformity (e.g., solutes in solution and/or solid supports in suspension) and/or foam formation in the containers does not comply with one or more thresholds, the multi-phase mixing procedure may be modified ("YES") by cycling back to step 814. As noted above, the degree of foam formation may be determined by one or more sensors for identifying irregularities, such as the presence of foam in dispensed or aspirated fluid, by detecting discontinuities in fluid flow through the pipettor and/or by detecting irregularities in a pressure signal. Additionally or alternatively, the degree of foam formation may be determined through visual observation, level detection heights by a pipettor, and/or image analysis with a camera, one or more of which may provide for real-time on-the-fly adjustment of mixing rates and durations. If the degree of uniformity is below a predetermined threshold, then in step 814, rates and/or the period of time of one or more of the mixing phases may be increased to enhance mixing, and/or the period of time of one or more of the non-mixing phases may be decreased to give less time for solutes to come out of solution and/or for solid supports to come out of suspension. If the amount of foam is excessive (i.e., above a predetermined threshold), then instep 814, rates and/or periods of time of one or more of the mixing phases may be decreased, and/or the periods of time of one or more of the non-mixing phases may be increased to generate less foam during mixing and/or to provide foam with time to dissipate during a non-mixing phase.

Additionally or alternatively, changing fill heights of one or more of the containers, as a result of fluid contents being aspirated from the containers, may warrant modification of the multi-phase mixing procedure, as fill heights may be one factor taken into consideration when designing a multi-phase mixing procedure. Controller 802 may monitor fill heights of the containers by comparing present and past fluid levels sensed by the pipettor, tracking the number of aspirations into the pipettor, and/or tracking volumes aspirated by the pipettor. Additionally or alternatively, fill heights may be monitored using a capacitive sensor on an outside of a container, a vision/imaging system, a scale or similar weighing device for weighing a container and its contents, an in-container float sensor, an ultrasonic or Doppler-based sensor, and the like. Modifying the multi-phase mixing procedure may include modifying one or more of the rates of the mixing phases, and/or one or more of the durations of the mixing and non-mixing phases, to bring the feedback data into compliance with the one or more thresholds. If, on the other hand, the feedback data is in compliance with the one or more thresholds, the multi-phase mixing procedure may be repeated without adjustment ("NO") as method 812 reverts back to step 816 for subsequent mixing. Repeating the multi-phase mixing procedure helps keep the fluid contents in the containers adequately mixed over a long period of time.

In one specific example involving the insertion of one or more large containers of TCR (bottles having a volume of 280 mL and a diameter of 72 mm), one or more medium containers of TCR (bottles having a volume of 125 mL and a diameter of 50 mm), and one or more small containers of TCR (bottles having a volume of 60 mL and a diameter of 35 mm) into container tray 110 (shown in FIG. 1), and using the data associated with the graphs of FIGS. 9A-9C, a first cycle of a multi-phase mixing procedure may include performing 30 seconds of a mixing motion using orbital drive system 300 (shown in FIGS. 2 and 3) running at a frequency of 5 Hz, followed by performing 60 seconds of the mixing motion at a frequency of 3 Hz, and refraining from performing the mixing motion until 30 minutes from the start of the first cycle has lapsed. Subsequent maintenance cycles of the multi-phase mixing procedure may be performed at a regular time interval (e.g., every 30 minutes), and may include performing two mixing phases at the same frequencies as the two mixing phases of the first cycle, but for half the duration (e.g., 15 seconds at 5 Hz and 30 seconds at 3 Hz).

Additional and/or alternative methods of mixing are described in U.S. Pat. No. 7,135,145. Each of the U.S. patent application publications and U.S. patents referred to in the specification is incorporated herein by reference in its entirety.

It will be apparent to those skilled in the art that various modifications and variations can be made in the disclosed systems and processes without departing from the scope of the disclosure. Other examples of the disclosure will be apparent to those skilled in the art from consideration of the specification and practice of the disclosure disclosed herein. It is intended that the specification and examples be considered as exemplary only.

I claim:
1. A method for mixing fluids in containers, comprising:
   simultaneously performing a first mixing procedure on each of a plurality of containers situated on a container support platform, the container support platform including a container tray defining a plurality of recesses for holding the plurality of containers, the plurality of containers comprising at least two differently sized containers, wherein the first mixing procedure includes:
  a plurality of mixing phases, wherein each mixing phase of the plurality of mixing phases consists of rotating the container support platform with the container tray about a single axis at a single rate for a period of time of about 5 seconds or longer, and wherein the single rate for at least one mixing phase of the plurality of mixing phases differs from the single rate for at least one other mixing phase of the plurality of mixing phases, wherein the single axis extends substantially perpendicular to the container tray and is offset from each of the plurality of recesses defined in the container tray; and
  at least one non-mixing phase, wherein the container support platform is not subjected to the mixing motion.

2. The method of claim 1, wherein the single axis is offset from a center of the container support platform.

3. The method of claim 1, wherein the single axis extends through a center of the container support platform.

4. The method of claim 1, wherein the single rate for each of the plurality of mixing phases is a speed of the container support platform, and the speed of the container support platform is different for one mixing phase relative to the speed of the container support platform for an adjacent mixing phase of the plurality of mixing phases.

5. The method of claim 1, wherein the single rate for each of the plurality of mixing phases is a frequency of rotation of the container support platform about the single axis, and the frequency of rotation is different for one mixing phase relative to the frequency of rotation of the container support platform for an adjacent mixing phase of the plurality of mixing phases.

6. The method of claim 1, wherein rotating the container support platform during each mixing phase of the plurality of mixing phases results in swirling of fluids in the containers.

7. The method of claim 6, wherein the swirling of the fluids results in the formation of waves in the fluids, and wherein amplitudes of the waves reach one or more predetermined threshold values.

8. The method of claim 1, wherein the first mixing procedure includes a first cycle of mixing phases and a second cycle of mixing phases, wherein the single rate of each of the plurality of mixing phases of the first cycle is the same as the single rate of each of the plurality of mixing phases of the second cycle, and wherein the periods of time of the mixing phases of the first cycle are longer than the periods of time of the mixing phases of the second cycle.

9. The method of claim 1, wherein in the at least one non-mixing phase, the container support platform is motionless.

10. The method of claim 1, wherein in the at least one non-mixing phase, the container moves.

11. The method of claim 1, further comprising:
  (b) obtaining feedback after performing the first mixing procedure, the feedback indicating a characteristic of a fluid held in one or more of the plurality of containers;
  (c) modifying the single rate or the period of time for one or more of the plurality mixing phases of the first mixing procedure based on the feedback; and
  (d) simultaneously performing a second mixing procedure on each of the plurality of containers, the second mixing procedure including the one or more mixing phases having the modified single rate or the modified period of time.

12. The method of claim 11, wherein the feedback characteristic is indicative of an effectiveness of the plurality of mixing phases at mixing one or more fluids in one or more containers of the plurality of containers.

13. The method of claim 11, wherein the feedback characteristic is indicative of an amount of foam formed in one or more fluids in one or more containers of the plurality of containers.

14. The method of claim 11 wherein the second mixing procedure is performed in real-time in response to obtaining feedback and modifying the single rate or the period of time for the one or more mixing phases.

15. The method of claim 11 wherein obtaining feedback includes using a sensor that detects at least one of a degree of mixing uniformity, a degree of foam formation, a degree of precipitate formation, and a level of fluid height in the one or more containers.

16. The method of claim 1, wherein the plurality of containers are held in an upright position when received in the plurality of recesses defined by the container tray and during each of the plurality of mixing phases.

17. A method for mixing fluids in containers, comprising:
  simultaneously performing a mixing procedure on each of a plurality of containers situated on a container support platform, the container support platform including a container tray defining a plurality of recesses for holding the plurality of containers, the plurality of containers including at least a first container and a second container sized differently than the first container, the mixing procedure including:
    a first mixing phase, wherein the first mixing phase consists of rotating the container support platform with the container tray about a single axis at a first rate for a first period of time of about 5 seconds or longer;
    a second mixing phase performed after the first mixing phase, wherein the second mixing phase consists of rotating the container support platform with the container tray about the single axis at a second rate for a second period of time of about 5 seconds or longer, the first rate being different than the second rate, and the first period of time being different than the second period of time; and
    after the second mixing phase, not performing any mixing motion for a third period of time,
    wherein the single axis extends substantially perpendicular to the container tray and is offset from each of the plurality of recesses defined in the container tray.

18. The method of claim 17, wherein the single axis is offset from a center of the container support platform.

19. The method of claim 17, wherein the single axis extends through a center of the container support platform.

20. The method of claim 17, wherein at least one of the first rate and the second rate includes a speed of the container support platform.

21. The method of claim 17, wherein at least one of the first rate and the second rate includes a frequency of the rotation of the container support platform.

22. The method of claim 17, wherein the first rate is greater than the second rate.

23. The method of claim 17, wherein the first period of time is shorter than the second period of time.

24. The method of claim 17, further comprising repeating the mixing procedure at least once.

25. A method for mixing fluids in containers, comprising:
performing a mixing procedure on each of a plurality of containers situated on a container support platform, the container support platform including a container tray defining a plurality of recesses for holding the plurality of containers, the mixing procedure including:
a first phase, wherein the first phase consists of rotating the container support platform with the container tray about a single axis at a first rate for a first period of time longer than about 5 seconds, wherein the first rate and the first period of time are selected to substantially uniformly mix a fluid in a first container of the plurality of containers, wherein the first container has a first size;
a second phase performed after the first phase, wherein the second phase consists of rotating the container support platform with the container tray about the single axis at a second rate for a second period of time longer than about 5 seconds, the first rate being different than the second rate, wherein the second rate and the second period of time are selected to substantially uniformly mix a fluid in a second container of the plurality of containers, and wherein the second container has a second size different than the first size; and
a third phase performed after the second phase, wherein the third phase includes not moving the container support platform for a third period of time, and wherein the third period of time is selected to allow foam formed in the fluid of at least one of the first and second containers to dissipate,
wherein the single axis extends substantially perpendicular to the container tray and is offset from each of the plurality of recesses defined in the container tray.

26. A method for mixing fluids in containers, comprising:
identifying a first set of rates at which a first container having a first size is movable to result in a first set of values indicative of degrees of mixing of a first fluid in the first container, and identifying a second set of rates at which a second container having a second size different than the first size is movable to result in a second set of values indicative of degrees of mixing of a second fluid in the second container;
selecting a first rate from the first set of rates based at least in part on the first set of values, and selecting a second rate from the second set of rates based at least in part on the second set of values;
performing a mixing procedure with a container support platform including a container tray defining a plurality of recesses holding the first and second containers so that the first and second fluids are mixed at the same time, wherein the mixing procedure includes a first phase consisting of rotating the container support platform with the container tray about a single axis at the first rate for a first period of time longer than about 5 seconds and a second phase consisting of rotating the container support platform with the container tray about the single axis at the second rate for a second period of time longer than about 5 seconds, wherein the first and second containers are situated on the container support platform during the mixing procedure, wherein the single axis extends substantially perpendicular to the container tray and is offset from each of the plurality of recesses defined in the container tray; and
subjecting the container support platform to no mixing motion for a third period of time while the first and second containers are situated on the container support platform.

27. A method for mixing fluids in containers, comprising:
(a) performing a first mixing procedure on each of a plurality of containers situated on a container support platform, the container support platform including a container tray defining a plurality of recesses for holding the plurality of containers, wherein the first mixing procedure consists of the following ordered sub-steps:
(i) rotating the container support platform with the container tray about a single axis at a first rate for a first period of time longer than about 5 seconds;
(ii) rotating the container support platform with the container tray about the single axis at a second rate for a second period of time longer than about 5 seconds, wherein the first rate is different than the second rate; and
(iii) stopping the container support platform, and not moving the container support platform for a third period of time,
wherein the single axis extends substantially perpendicular to the container tray and is offset from each of the plurality of recesses defined in the tray.

28. A method for mixing fluids in containers, comprising:
(a) performing a mixing procedure on each of a plurality of containers situated on a container support platform, the container support platform including a container tray defining a plurality of recesses for holding the plurality of containers, the mixing procedure including the following ordered sub-steps:
(i) a first phase consisting of rotating the container support platform with the container tray about a single axis at a first rate for a first period of time longer than about 5 seconds, wherein the first rate and the first period of time are selected to substantially uniformly mix a first fluid in a first container of the plurality of containers, wherein the first container has a first size;
(ii) a second phase consisting of rotating the container support platform with the container tray about the single axis at a second rate for a second period of time longer than about 5 seconds, wherein the first rate is different than the second rate, wherein the second rate and the second period of time are selected to substantially uniformly mix a second fluid in a second container of the plurality of containers, wherein the second container has a second size different than the first size; and
(iii) at least one non-mixing phase consisting of not performing the mixing motion on the container support platform for a third period of time,
wherein the single axis extends substantially perpendicular to the container tray and is offset from each of the plurality of recesses defined in the container tray.

29. A system for mixing fluids in a plurality of differently sized containers, comprising:
a container support platform including a container tray defining a plurality of recesses for receiving the plurality of differently sized containers thereon, wherein the plurality of differently sized containers include a first container having a first size and a second container having a second size different than the first size;
a drive system operatively coupled to the container support platform, wherein the drive system is configured to simultaneously move the plurality of differently sized containers received by the plurality of recesses of the container tray disposed on the container support platform, and the container support platform, in a mixing motion; and a controller operatively coupled to the drive system, wherein the controller is configured to control operation of the drive system to perform a mixing procedure with the container support platform, wherein the mixing procedure includes:

a first phase consisting of rotating the container support platform with the container tray about a single axis at a first rate for a first period of time longer than about 5 seconds, a second phase consisting of rotating the container support platform with the container tray about the single axis at a second rate for a second period of time longer than about 5 seconds, the first rate being different than the second rate, and at least one non-mixing phase consisting of stopping the container support platform and not moving the container support platform for a third period of time, wherein the single axis extends substantially perpendicular to the container tray and is offset from each of the plurality of recesses defined in the container tray.

* * * * *